US007149681B2

(12) United States Patent
Hu et al.

(10) Patent No.: US 7,149,681 B2
(45) Date of Patent: Dec. 12, 2006

(54) METHOD, SYSTEM AND PROGRAM PRODUCT FOR RESOLVING WORD AMBIGUITY IN TEXT LANGUAGE TRANSLATION

(75) Inventors: Gang Hu, Beijing (CN); Jian Min Jiang, Beijing (CN); Zhao Ming Qiu, Beijing (CN); Donald T. Tang, Mt. Kisco, NY (US); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1318 days.

(21) Appl. No.: 09/740,780

(22) Filed: Dec. 19, 2000

(65) Prior Publication Data

US 2001/0014902 A1  Aug. 16, 2001

(30) Foreign Application Priority Data

Dec. 24, 1999  (CN) ............................. 99 1 26567

(51) Int. Cl.
*G06F 17/27* (2006.01)
(52) U.S. Cl. ............................. 704/2; 704/4
(58) Field of Classification Search ............... 704/2
See application file for complete search history.

(56) References Cited

U.S. PATENT DOCUMENTS

| 5,293,584 | A | * | 3/1994 | Brown et al. ............... 704/277 |
| 5,983,169 | A | * | 11/1999 | Kozma ......................... 704/2 |
| 6,269,189 | B1 | * | 7/2001 | Chanod ..................... 382/229 |
| 6,282,511 | B1 | * | 8/2001 | Mayer ........................ 704/270 |
| 6,295,542 | B1 | * | 9/2001 | Corbin ..................... 715/501.1 |
| 6,393,389 | B1 | * | 5/2002 | Chanod et al. ................ 704/7 |
| 6,470,306 | B1 | * | 10/2002 | Pringle et al. ................ 704/3 |
| 6,516,321 | B1 | * | 2/2003 | De La Huerga ............ 707/102 |

* cited by examiner

*Primary Examiner*—Susan McFadden
(74) *Attorney, Agent, or Firm*—John E. Campbell; Floyd A Gonzalez (57) ABSTRACT

This invention discloses a computer translation method and system for resoving word ambiguity. During translating a text in a first language, checking whether or not the word to be translated or the sentence containing the word has additional related text that is associated by a linkage. When the meaning of the word can not be uniquely determined in a second language by analyzing the context than the related text is obtained according to the linkage and the word is translated using both the immediate text and the related text. The linkage mechanism is described as a hyperlink in a HTML document.

37 Claims, 4 Drawing Sheets

METHOD, SYSTEM AND PROGRAM PRODUCT FOR RESOLVING WORD AMBIGUITY IN TEXT LANGUAGE TRANSLATION

TECHNICAL FIELD OF THE INVENTION

This invention relates to a machine translation method and system for text translation, and particularly, to a machine translation method and system for word meaning disambiguation based on hyperlink information.

BACKGROUND OF THE INVENTION

Machine translation is a technology which uses a computer to translate one kind of words or spoken language into another kind of words or spoken language. That is to say, on the basis of theory about language form and structure analysis in linguistics, relying on mathematically established machine lexicon and machine grammar, using the great storage capacity and data processing ability of computers, the auto-translation from one language into one or more other languages is accomplished without artificial interference. Machine translation is a frontier applied science being introduced into many branches of learning such as linguistics, computer linguistics and computer science etc. In order to realize the translation function, the machine translation system must have the capacities of word analyzing, sentence analyzing, grammar analyzing, dictionary lexicon, collocation lexicon, word meaning analyzing and the language outputting. The machine translation system includes several types such as conversion type, knowledge and word meaning type, but the functions and properties of those types are comprehensively used in practice.

Currently used machine translation systems can give sentence level translation. For a given article, some of systems can select the proper meanings of the word by statically analyzing the context.

With increased popularity of the Internet and the World Wide Web (Web), the machine translation systems can not satisfy the need to select the proper meaning of the words on the Web only by statically analyzing the context. For example, when a user visits some Internet sites by using the web browser he/she can read the web pages which is written in HTML (HyperText Markup Language) and may comprise other files including GIF, JPEG or the like. Also, there are often many hyperlinks in the web pages. The hyperlinks are objects that connect the page to other pages. Thus, when translation systems try to translate the Web pages, they should not be limited to the static analysis within a context of the page. When there is more than one meaning for a word, the word is ambiguous. The process of determining one of a multiple meaning for an ambiguous word is disambiguation. When it is impossible to determine the appropriate meaning of a word on the basis of the context, the appropriate meaning can be selected by dynamically analyzing associated hyperlinked information. For example, a news web page contains some titles which have hyperlinks. One such hyperlink is "Clinton wins senate support as Kosovo strikes near". Here, we assume that the source language is English and that the target language is Chinese. For the translation system, it is very difficult to determine that of several possible meanings, for example, of the word "strike" the correct one is Chinese "袭击". It may be "罢工", "打", or ""好球". If no other information is available, "strike", as a noun, usually is translated as "罢工'". The text that is linked to is:

"President Clinton sought and won support from Congress for Military action against Yugoslavia just hours after NATO ordered air strikes that could begin as early as Wednesday".

The multi-word "air strike" is contained in the above text. The multi-word "air strike" has only one meaning in Chinese: "空袭". The meaning of "strike" in the multi-word "air strike" is "袭击". Thus, from the meaning of the multi-word "air strike", the meaning of "strike" in the title can be determined. In most cases, a word in the context of one topic has only one meaning. Our invention is based on such an assumption.

Existing machine translation systems can give sentence level translation, when determining the meaning of the words they select the proper meanings of the word only by statically analyzing the context of the sentence and can not improve the accuracy of the translation by dynamically analyzing related text. For the Internet users, such existing machine translation systems are not sufficient. In the above example, a user is interested in the Chinese translation "袭击" but not "罢工", if the machine translation system gives a translation of the title as the topic "罢工", the user may not read further and thus miss the details about "air strike".

SUMMARY OF THE INVENTION

In order to solve the above problem, this invention proposes a machine translation method and machine translation system for word meaning disambiguation based on hyperlink information.

According to an aspect of the invention, there is provided a machine translation method for word meaning disambiguation, comprising the steps of:

during translating a text in a first language, checking whether or not the word to be translated or the sentence containing the word has hyperlink information associated with it when the meaning of the word can not be determined for a second language by analyzing the context;

if so, getting the referenced documents from hyperlink information, translating the word into the second language based on the referenced documents.

According to another aspect of the invention, the text in the first language described above is the web pages published by HTML language over the World Wide Web, and said related hyperlink information is used to describe the relationship among the web pages and individual parts in the same web page. According to a further aspect of the invention, there is provided a machine translation system for word meaning disambiguation, for translating text in a first language into text in a second language, the system comprising:

dictionary lexicon, word meaning analyzer, morphology analyzer, syntax analyzer, grammar analyzer, sementeme analyer and outputting means for the translation results. The system is characterized by further comprising a hyperlink information processor for checking whether or not the word to be translated or the sentence containing said word has hyperlinked information when the meaning of the word can not be uniquely determined in a second language by the word meaning analyzer through analyzing the context. If so, getting the referenced documents from hyperlink information, translating the word into the second language based on the referenced documents.

In view of this, the inventive machine translation method and system for word meaning disambiguation based on hyperlink information can improve the accuracy of the translation.

These and other objects will be apparent to one skilled in the art from the following drawings and detailed description of the invention.

DESCRIPTION OF THE PREFERRED EMBODIMENTS

The technology terms used in this specification are presented as follows:

HTML: The full name of HTML is "HyperText Markup Language", the Chinese name being "超文本标记语言", and simply speaking, it is the lingua franca for all Internet sites, the web pages being constituted on the basis of files in HTML format by attaching some other language tools (such as JavaScript, VBScript, JavaApplet etc.). Besides some fundamental words, these files further include some tags which are composed of "<" and ">" as well as a character string as shown in the following examples, while the function of the browser is to interpret the tags to display the words, images and animation, and to output sounds.
<HTML>
<HEAD>
<TITLE>web page title </TITLE>
</HEAD>
<BODY BGCOLOR="#FFFFFF">
<P>here is the text of the HTML file</P>
</BODY>
</HTML>

URL: The full name of URL is "Uniform Resource Locator", the Chinese name being "统一资源定位器". Simply speaking, it is the user's view of an address of a Web site on the Internet. It is an address to a file in a Server. URL make it possible to direct both network users and software applications to obtain a variety of information transmitted from different network station by use of different Internet protocols.

HyperLink: Hyperlinks are objects that, when selected, connect to other objects. A Hyperlink on a web page can be selected by a user's computer "mouse" causing an associated web page to appear on the user's terminal. Hyperlinks interconnect Web pages. There are three kind of hyperlinks in the web pages: the first being the hyperlink containing an absolute URL, for example, the link to IBM main web page from your web terminal (http//www.ibm.com); the second is a hyperlink of a relative URL, for example, the link which links a paragraph of words or titles in your main web page to the other web pages of the same web site; the third kind of hyperlink permit navigation within a web page, i.e. bookmark.

Parent-Phrase: A parent-phrase of a word is a phrase or a collocation of words that contain the word. For example, the phrase "air strike" is the parent—phrase for word "strike".

Transfer Lexicon is a word or phrase level English to Chinese bilingual dictionary.

The preferred embodiments according to the invention will be described below in conjunction with the accompanying diagrams.

Figure 1:
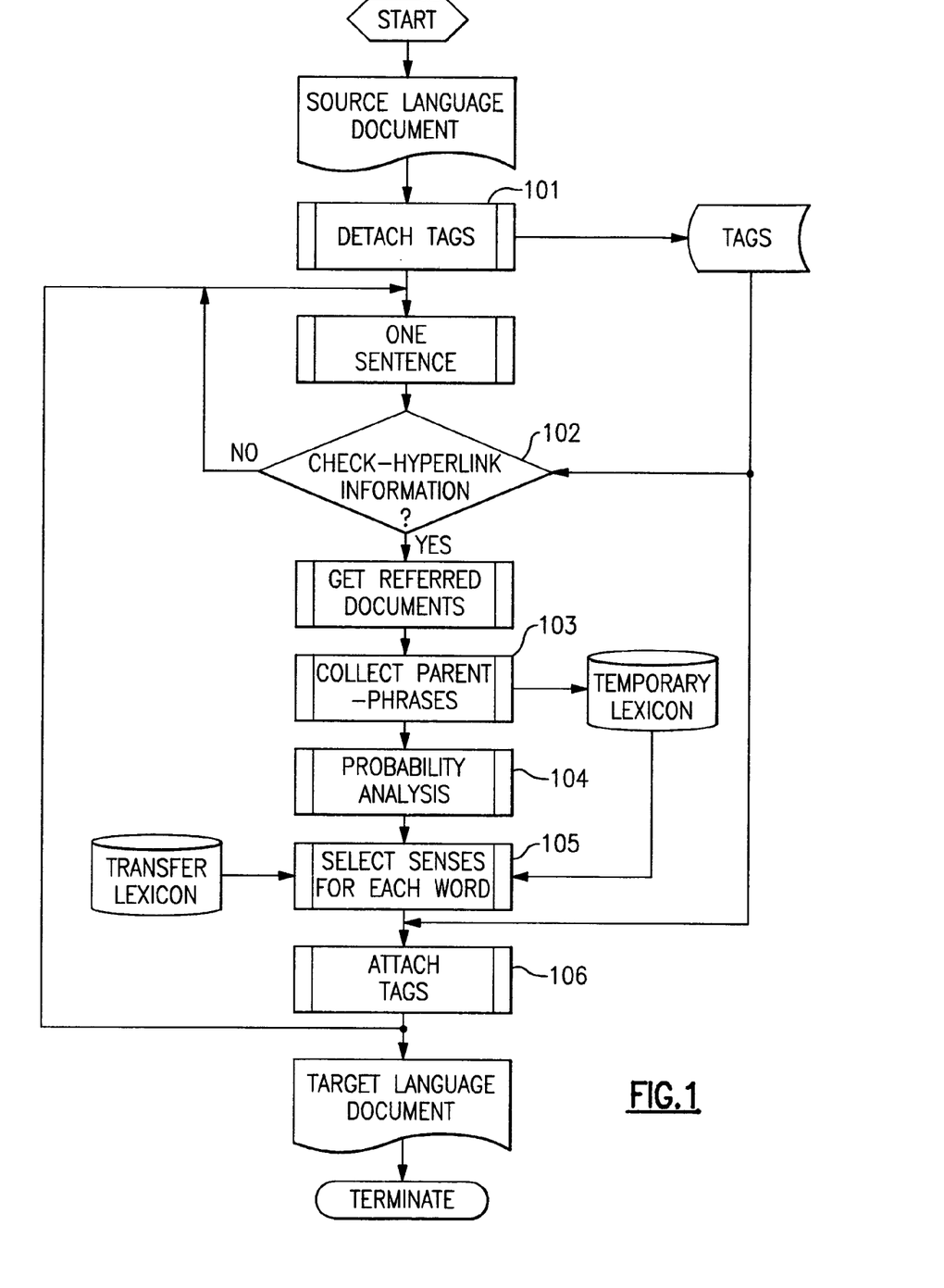
FIG. 1 is a flow chart describing a machine translation method for word meaning disambiguation according to a preferred embodiment of the invention.

As shown in FIG. 1, a machine translation method for word meaning disambiguation according to a preferred embodiment of the invention comprises:

Step 101: Detach the tags. In order to make the machine translation for the documents in a first language, all the tags are generally detached prior to the translation, that is, detaching the marks which are artificially attached for publishing documents on the network. All detached tags are placed in a tag database. Generally, after the document is translated, the tags are attached again before returning the translation results. Thus the browser can use the tags to display the documents in a second language.

Step 102: Hyperlink checking. This procedure is used to check whether or not a sentence or some words in the sentence have hyperlinks. For the documents published in HTML, the hyperlink can be a named location within the current page, or a URL acting as a network address. A URL to be processed must satisfy the following conditions:

1. The network protocol must be HTTP protocol;
2. Content-type must be text/html.

For example, a sentence with a hyperlink may be:

I love this <A HREF=http://abc.xyz.net/game.html> game</A.>.

In addition to web pages, the machine translation method of the present invention is also suitable for other documents having hyperlink information (such as links and bookmarks). For example, Adobe Portable Document format (PDF) files, Lotus Notes files, Microsoft Word files, Microsoft Windows help files, etc. It is well known by those skilled in the art that the method of the invention can be useful for other types of documents by merely changing the hyperlink checking step.

For example, for Microsoft Word RTF documents, the hyperlink may be bookmarks or URL in the files. The example described above can therefore be written in RTF format as:

I like this {\field {\fldinst HYPERLINK "http://abc.xyz-.net/game.html"} {\fldinst game}}.

Step 103: Collect parent-phrases. After the referenced documents are obtained on the base of hyperlink information, the parent-phrases in the plain text can be collected sentence by sentence. The particular procedure will be illustrated in detail later in conjunction with FIG. 2.

It should be noted that the referenced documents can be from layer-1 hyperlink and that they can also be from any layer hyperlink.

Step 104: Probability analysis. This procedure is to analyze the probability for each meaning. The particular procedure will be illustrated in detail later in conjunction with FIG. 3.

Step 105: Select meanings. This procedure will be illustrated in detail later.

Step 106: Attach the tags and send the results.

It is shown in the above description that the machine translation method for word meaning disambiguation of the invention can dynamically analyze the hyperlink information, get the referenced documents from hyperlink information, determine the meaning of the words to be translated from the referenced documents, and thus improve accuracy of the machine translation.

Figure 2:
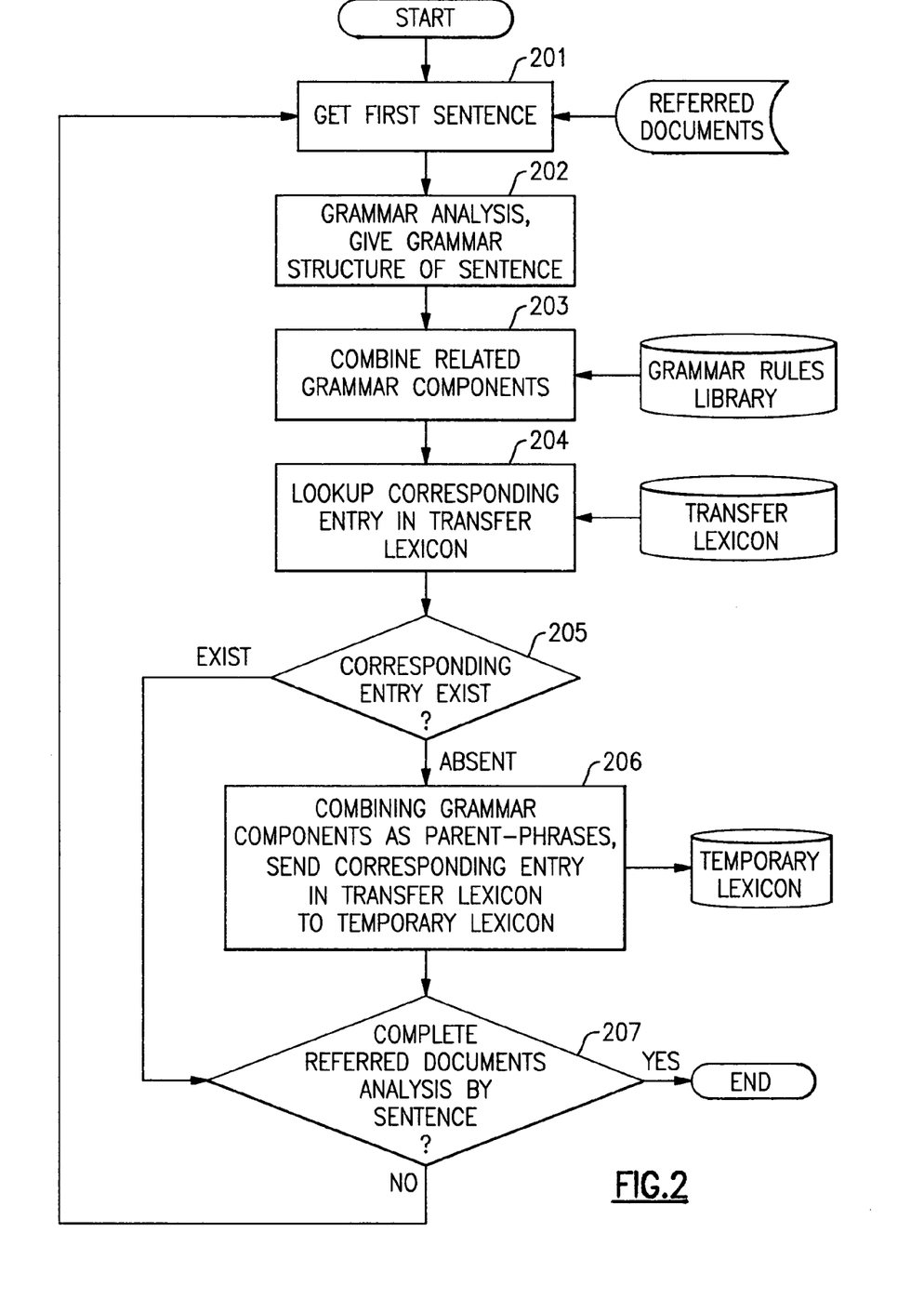
FIG. 2 is a flow chart describing a process for performing collection of parent-phrases according to a preferred embodiment of the invention.

The parent-phrases collecting procedure is explained below in conjunction with FIG. 2. As shown in FIG. 2, for each sentence in the document 201, a grammatical structure 202 of the sentence is given by parsing. For the example mentioned above, the clause "NATO ordered air strike" can be parsed as:

| NATO | order | air strike |
|---|---|---|
| subject | verb | object |

The multi-word "air strike" is a grammatical component 203. For this case, "air strike" can be considered as a parent-phrase of word "strike". The corresponding entry is found in the transfer lexicon 204 as:

air strike<n(ac)<t(空袭)<o(次)<x(,袭击)

Within the entry, the "n" indicates the "air strike" is a noun. The "ac" means "action", which is its semantic class. "t(空袭)" represents it can be translated as "空袭". "o(次)" denotes that its measure in Chinese as "次". And finally, "x(,袭击)" tells that "air strike" is a parent-phrase of "strike" and "strike" has the sense "袭击" and "air strike" is not a parent-phrase of word "air".

For another example "He received his doctoral degree", the grammatical structure is obtained as follows by parsing 202:

| he | receive | his | doctoral | degree |
|---|---|---|---|---|
| subject | verb | pron--> | adj--> | object |

The word "his" and "doctoral" are two modifiers for word "degree". Such related grammar components can be combined according the grammar rules 203. In the transfer lexicon, the following entry is selected 204:

receive <v(Obj degree/)<t(获得*学位)<
    x(学位, ab, 个)

Within the entry, "v" indicates this is a verb phrase. "(Obj degree/)" indicates that the verb "receive" needs to have the word "degree" as its object. The slash "/" after "degree" means the word "degree" is the head word in the entry.

"t(获得*学位)" specifies the translation of the entry and the "*" can be replaced by the modifiers of word "degree".

"x(学位, ab, 个)" represents the information for the head word "degree": its translation (学位) semantic class (abstract object) and measure unit (个). Thus the phrase "receive(v) degree(ovj)" is a parent-phrase for word "degree".

All of the parent-phrases mentioned above can be obtained by processing the referenced document. The subsequent translation is performed by use of a temporary lexicon created by the parent-phrases which have the entries as follows:

strike<n (ac)<t(空袭)<o(次)

degree<n (ab)<t(学位)<o(个)

Figure 3:
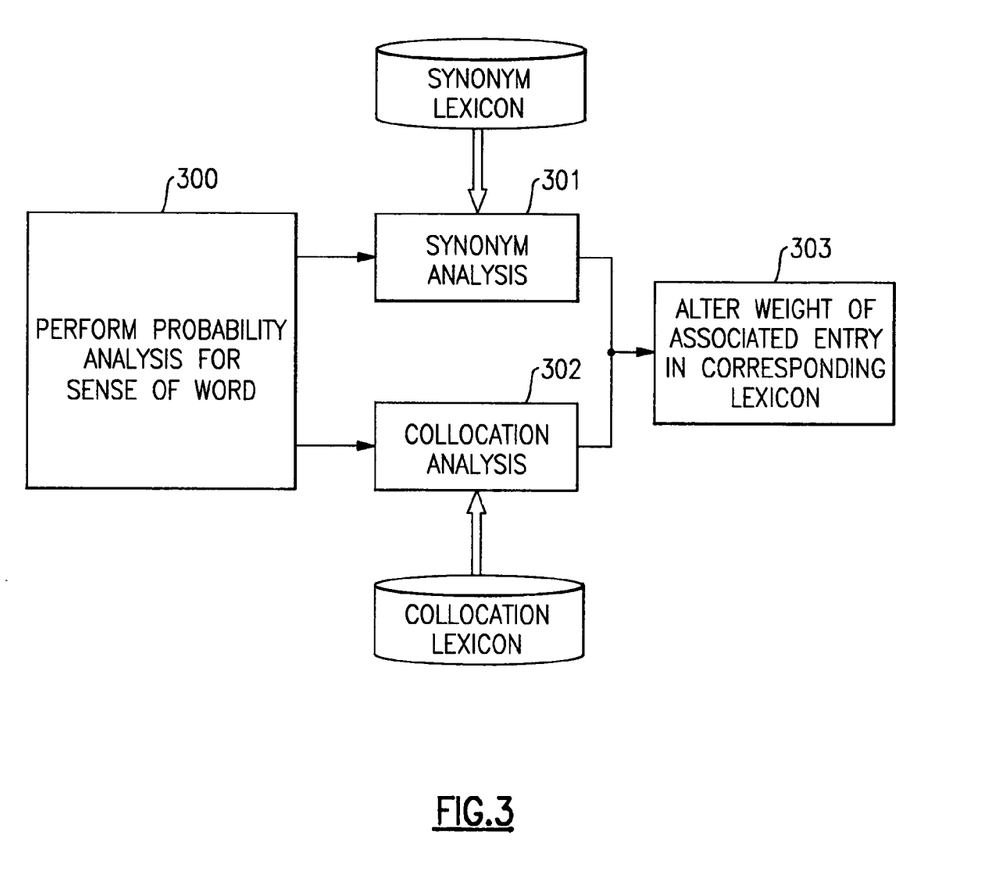
FIG. 3 is a flow chart describing a process for performing probability analysis of the word meaning according to a preferred embodiment of the invention.

The probability analysis procedure is described below with reference to FIG. 3. As shown in FIG. 3, the probability analysis procedure 300 is composed by two routines: synonym analysis 301 and local collocation analysis 302.

1. Synonym Analysis

For each meaning of the word to be disambiguated, the synonyms in the target language are marked in the associated document. If a synonym is found, then the possibility for the meaning will increase. For example, For the word "strike" in the sentence "China erupts in fury at NATO strike", one sentence in the associated document is:

"Thousands of people protested at U.S. and other diplomatic missions in China Saturday in an officially sanctioned outpouring of fury at NATO's bombing of the Chinese embassy in Belgrade."

"袭击" in Chinese has the following synonyms:

"侧击 冲击 出击 打 动武 发 发射 反攻 反击 反扑 伏击 攻 攻打 攻击 攻坚 合击 袭击 轰炸 还击 还击 回击 回击 火攻 击 夹攻 夹击 截击 进攻 进击 狙击 开空袭 拦击 炮击 破击 奇袭 枪击 强攻 强占 侵袭 射击 投弹 突击 围攻 围击 袭击 拖杀 拖袭 伴攻 邀击 夜袭 炸 主攻 助攻 追击 阻击".

In the referenced document, the word "bombing" has a meaning as "轰炸", which is a synonym of "袭击". Thus, the meaning "袭击" for word "strike" is more possible then others. To implement this, the synonym lexicon will be scanned for each keyword in the associated document. If a synonym is found, the weight of the meaning for the word will be heavier. For the example mentioned above, the initial weights for word "strike" are as:

| meaning | weight |
|---|---|
| 罢工 | 40 |
| 袭击 | 33 |
| 打 | 21 |
| 好球 | 2 |

Where the weights are the frequency for each meaning in a large corpus. After the synonym analysis, the weights become:

| meaning | weight |
|---|---|
| 罢工 | 40 |
| 袭击 | 33 + 10 |
| 打 | 21 |
| 好球 | 2 |

2. Local Collocation Analysis:

The source language parsing can give a local syntactic relation for a sentence. For example, the word to be disambiguated is developed in the sentence "He developed the film". In the transfer lexicon, the entries for verb "develop" with an object are:

develop<v (obj 1)<t(成长)

develop<v (obj 1)<t(冲洗)

develop<v (obj 1)<t(发展)

develop<v (obj 1)<t(使 obj 1成长)

develop<v (obj 1)<t(使 obj 1形成)

The parsing indicates that develop and film have the verb-object syntactic relation. The word film as a noun has the following meanings:

film<n (mm na)<t(薄层)<o0 film<n (mm)<t(薄膜)<o(片)

film<n (mm)<t(胶片)<o(张)

film<n (ab)<t(影片)<o(部)

film<n (ab)<t(影片业)<o0

The frequencies for the combinations with the verb-object syntatic relation in the target language corpus are as:

|  | 薄层 | 薄膜 | 胶片 | 影片 | 影片业 |
|---|---|---|---|---|---|
| 成长 | 0 | 0 | 0 | 0 | 0 |
| 冲洗 | 1 | 2 | 7 | 0 | 0 |
| 发展 | 0 | 0 | 0 | 0 | 2 |
| 使…成长 | 0 | 1 | 2 | 0 | 0 |
| 开发 | 0 | 0 | 0 | 0 | 1 |
| 使…形成 | 0 | 0 | 0 | 0 | 0 |

Here, the pair "冲洗胶片" is the most possible collocation.

The syntactic relations used in the system are: verb-object, adjective-noun, subject-verb, adverb-verb, and noun-noun.

The below example shows how to select a proper meaning of a word by matching the entries in the temporary parent-phrase lexicon, collocation lexicon and transfer lexicon. Generally, the proper meaning of a word is selected according to the weight of the word in the lexicons. In the following example, since the weights of the entries in the temporary parent-phrase lexicon are much more than those of the others, for the word "strike" we select the meaning of the word in the temporary parent-phrase lexicon.

| 130 | strike<n(ac)<t(袭击)<o(次) | in parent-phrase lexicon: |
| 43 | strike<n(ac)<t(袭击)<o(次) | in synonym lexicon |
| 40 | strike<n(ab)<t(罢工)<o(次) | in transfer lexicon |
| 33 | strike<n(ac)<t(袭击)<o(次) | in transfer lexicon |
| 21 | strike<n(ac)<t(打)<o( ) | in transfer lexicon |
| 2 | strike<n(ab)<t(好球)<o(个) | in transfer lexicon |

Figure 4:
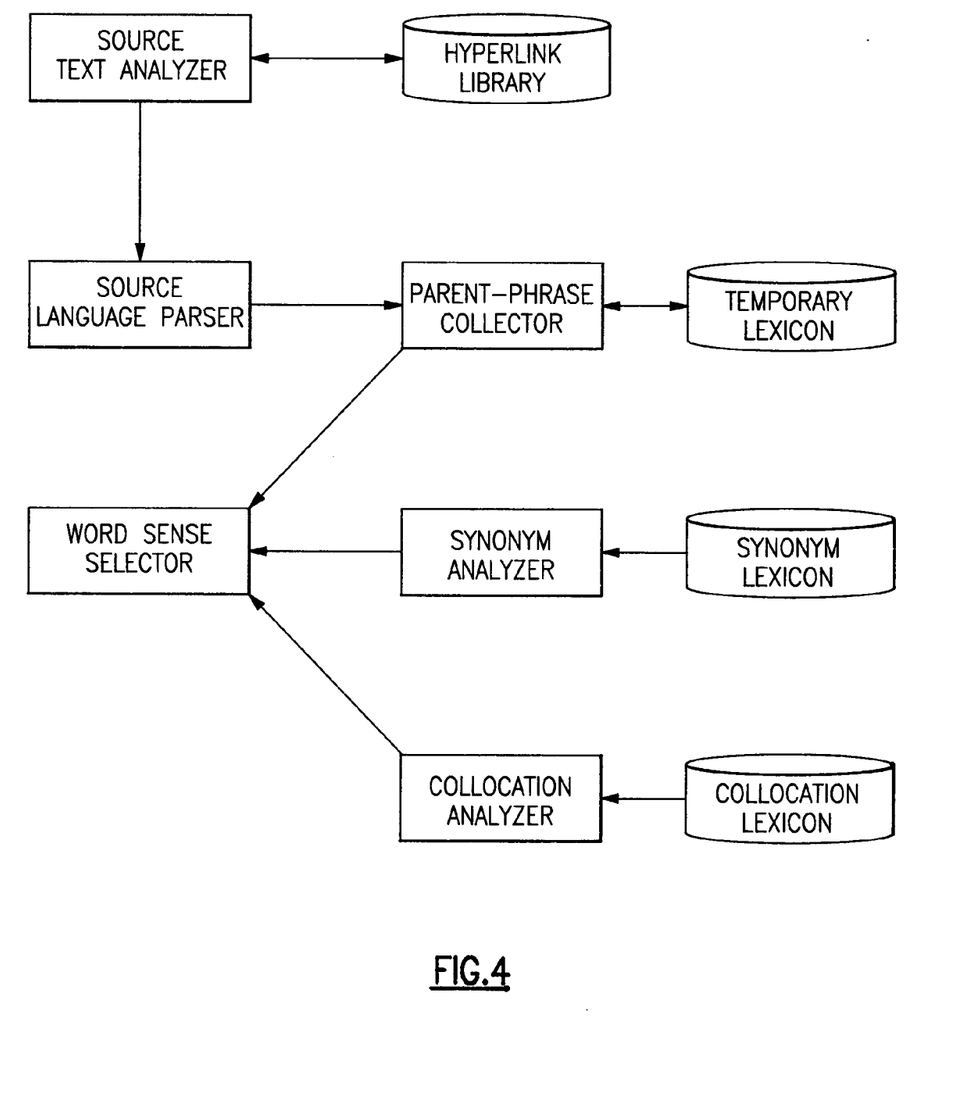
FIG. 4 is a block diagram describing a machine translation system for word meaning disambiguation according to a preferred embodiment of the invention.

With English as the source language (the first language) and Chinese as the target language (the second language), above is described a machine translation method for word meaning disambiguation utilizing hyperlink information according to a particular embodiment of the invention. The method has been embodied in an in-line web page translation system which is called a Homepage translator 2.0. The structure of the translation system is shown in FIG. 4. The machine translation system generally includes:

dictionary lexicon, word meaning analyzer, morphology analyzer, syntax analyzer, grammar analyzer, semantic meaning analyzer, and outputting means for the translation results.

A machine translation system for word meaning disambiguation on the base of hyperlink information according to a preferred embodiment of the invention further comprises a source text analyzer, i.e. a hyperlink information processor, for checking whether or not the word to be translated or the sentence containing the word has associated hyperlink information when the meaning of the word can not be determined in a second language by the word meaning analyzer through analyzing the context. If hyperlink information exists, the referenced documents are obtained using the hyperlink information, and the word is translated into the second language based on the referenced documents. As shown in FIG. 4, the source text analyzer checks whether the word has related hyperlink information, by reference to the hyperlink library, when the unique meaning of the word can not be determined by the word meaning analyzer through analyzing the context. If there is related hyperlink information, getting the referenced documents, parsing the referenced documents sentence by sentence, and putting the parent-phrases collected by the parent-phrases collector into a temporary lexicon for use in subsequent translation work. In order to improve the accuracy of translation for the meaning of the word in the translation system of the present invention, a synonym analysis is made by the synonym analyzer and a local collocation analysis is made by the collocation analyzer. Both synonym analyzer and collocation analyzer refer to their own lexicons (i.e. synonym lexicon and collocation lexicon) when performing probability analysis. After completing the probability analysis, the word meaning selector selects a translation result from the corresponding entries. The result being the word meaning having the highest weight.

It is seen from the above introduction that the accuracy of machine translation can be improved by the machine translation method and system for word meaning disambiguation based on hyperlink information according to the present invention.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for translating first text in a first language to second text in a second language, in an electronic document having said first text comprising immediate context, said electronic document further having a link to additional context, the link relating said first text to said additional context, the method comprising the steps of:
   a) analyzing a first phrase in its immediate context in the first text for the existence of a first translation to a unique phrase in the second text in the second language;
   b) translating the first phrase to a unique second phrase in the second text if the first translation is found to exist;
   c) using the link related to the first text to obtain the additional context if the unique phrase is not found; and
   d) then, using the additional context obtained, translating the first phrase to a second phrase in the second text in the second language if the first translation is not found to exist.

2. The method according to claim 1 wherein the first phrase is a word.

3. The method according to claim 1 wherein the link is a hyperlink in HTML code.

4. The method according to claim 1 wherein the first text is one of PDF file, Lotus Notes file, Lotus Word Pro file, Microsoft Word file or Microsoft Windows help file.

5. The method according to claim 1 comprising the further steps of:
   e) collecting parentphrases containing the first phrase from the additional context;

f) determining the probability for all possible second phrases of the parentphrases in the second language; and g) using the determined probability to select the best second phrase to be used in the translation.

6. The method according to claim 1 further comprising the steps of:
   e') parsing the context containing the phrase, giving a grammatical structure of the context;
   f') determining the parentphrases on the basis of combining the related grammatical components and searching a transfer lexicon; and
   g') constructing a temporary lexicon by corresponding entries of all the parentphrases in the transfer lexicon to be used in one or more successive translation procedures.

7. The method according to claim 5 wherein step f) comprises the steps of:
   f.1) analyzing using synonyms; and
   f.2) analyzing a local collocation.

8. The method according to claim 1 wherein the translating of step b) or step d) uses a dictionary lexicon.

9. The method according to claim 1 wherein the translating of step b) or step d) uses a word meaning analyzer.

10. The method according to claim 1 wherein the translating of step b) or step d) uses a sentence analyzer.

11. The method according to claim 1 wherein the first text is a sentence comprising a hyperlink in a first web page and the link is the hyperlink in the sentence, the hyperlink providing a link to the additional context in a web page.

12. The method according to claim 1 wherein the first text is in a first web page and the link is to context in a second web page.

13. The method according to claim 1, wherein the additional context is obtained from a document comprising the first text and the link related to the first text.

14. A system for translating first text in a first language to second text in a second language, in an electronic document having said first text comprising immediate context, said electronic document further having a link to additional context, the link relating said first text to said additional context, the system comprising:
   a) means for analyzing a first phrase in its immediate context in the first text for the existence of a first translation to a unique phrase in the second text in the second language;
   b) means for translating the first phrase to a unique second phrase in the second text if the first translation is found to exist;
   c) means for using the link related to the first text to obtain the additional context if the unique phrase is not found; and
   d) means for then, using the additional context obtained, translating the first phrase to a second phrase in the second text in the second language if the first translation is not found to exist.

15. The system according to claim 14 wherein the link is a hyperlink in HTML code.

16. The system according to claim 14 wherein the first text is one of PDF file, Lotus Notes file, Lotus Word Pro file, Microsoft Word file or Microsoft Windows help file.

17. The system according to claim 14 further comprising:
   e) means for collecting parentphrases containing the first phrase from the additional context;
   f) means for determining the probability for all possible second phrases of the parentphrases in the second language; and
   g) means for using the determined probability to select the best second phrase to be used in the translation.

18. The system according to claim 14 further comprising:
   e') means for parsing the context containing the phrase, giving a grammatical structure of the context;
   f') means for determining the parentphrases on the basis of combining the related grammatical components and searching a transfer lexicon; and
   g') means for constructing a temporary lexicon by corresponding entries of all the parentphrases in the transfer lexicon to be used in one or more successive translation procedures.

19. The system according to claim 14 further comprising:
   f.1) means for analyzing using synonyms; and
   f.2) means for analyzing a local collocation.

20. The system according to claim 14 wherein the translation means of b) or d) uses a dictionary lexicon.

21. The system according to claim 14 wherein the translation means of b) or d) uses a word meaning analyzer.

22. The system according to claim 14 wherein the translation means of b) or d) uses a sentence analyzer.

23. The system according to claim 14 wherein the first text is a sentence comprising a hyperlink in a first web page and the link is the hyperlink in the sentence, the hyperlink providing a link to the additional context in a web page.

24. The system according to claim 14 wherein the first text is in a first web page and the link is to context in a second web page.

25. The system according to claim 14 wherein the first phrase is a word.

26. A computer program product comprising a computer useable medium having computer readable program code means therein for translating first text in a first language to second text in a second language, in an electronic document having said first text comprising immediate context, said electronic document further having a link to additional context, the link relating said first text to said additional context, the computer program product comprising:
   c) using the link related to the first text to obtain the additional context if the unique phrase is not found; and
   a) computer readable program code means for analyzing a first phrase in its immediate context in the first text for the existence of a first translation to a unique phrase in the second text in the second language;
   b) computer readable program code means for translating the first phrase to a unique second phrase in the second text if the first translation is found to exist;
   c) computer readable program code means for using the link related to the first text to obtain the additional context if the unique phrase is not found; and
   d) computer readable program code means for then, using the additional context obtained, translating the first phrase to a second phrase in the second text in the second language if the first translation is not found to exist.

27. The computer program product according to claim 26 wherein the link is a hyperlink in HTML code.

28. The computer program product according to claim 26 wherein the first text is one of PDF file, Lotus Notes file, Lotus Word Pro file, Microsoft Word file or Microsoft Windows help file.

29. The computer program product according to claim 26 further comprising:
   e) computer readable program code means for collecting parentphrases containing the first phrase from the additional context;

f) computer readable program code means for determining the probability for all possible second phrases of the parentphrases in the second language; and g) computer readable program code means for using the determined probability to select the best second phrase to be used in the translation.

30. The computer program product according to claim 26 further comprising:

e') computer readable program code means for parsing the context containing the phrase, giving a grammatical structure of the context;

f') computer readable program code means for determining the parentphrases on the basis of combining the related grammatical components and searching a transfer lexicon; and g') computer readable program code means for constructing a temporary lexicon by corresponding entries of all the parentphrases in the transfer lexicon to be used in one or more successive translation procedures.

31. The computer program product according to claim 26 wherein computer readable program code means f) further comprises:

f.1) computer readable program code means for analyzing using synonyms; and f.2) computer readable program code means for analyzing a local collocation.

32. The computer program product according to claim 26 wherein the translation means of b) or d) uses a dictionary lexicon.

33. The computer program product according to claim 26 wherein the translation means of b) or d) uses a word meaning analyzer.

34. The computer program product according to claim 26 wherein the translation means of b) or d) uses a sentence analyzer.

35. The computer program product according to claim 26 wherein the first text is in a first web page and the link is to context in the first web page.

36. The computer program product according to claim 26 wherein the first text is a sentence comprising a hyperlink in a first web page and the link is the hyperlink in the sentence, the hyperlink providing a link to the additional context in a web page.

37. The computer program product according to claim 26 wherein the first phrase is a word.

* * * * *